(12) United States Patent
Ishii

(10) Patent No.: US 10,089,088 B2
(45) Date of Patent: Oct. 2, 2018

(54) COMPUTER THAT PERFORMS COMPILING, COMPILER PROGRAM, AND LINK PROGRAM

(71) Applicant: FUJITSU LIMITED, Kawasaki-shi, Kanagawa (JP)

(72) Inventor: Kuninori Ishii, Odawara (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 15/165,419

(22) Filed: May 26, 2016

(65) Prior Publication Data

US 2016/0371068 A1 Dec. 22, 2016

(30) Foreign Application Priority Data

Jun. 16, 2015 (JP) ................................ 2015-121358

(51) Int. Cl.
*G06F 9/45* (2006.01)
*G06F 8/41* (2018.01)

(52) U.S. Cl.
CPC .................................... *G06F 8/452* (2013.01)

(58) Field of Classification Search
None
See application file for complete search history.

(56) References Cited

U.S. PATENT DOCUMENTS

| 6,345,384 | B1* | 2/2002 | Sato ........................ G06F 8/443 717/160 |
| 7,606,694 | B1* | 10/2009 | Carrillo ............... G06F 17/5022 703/14 |
| 2006/0112377 | A1* | 5/2006 | Nacul ..................... G06F 8/456 717/140 |
| 2008/0127149 | A1* | 5/2008 | Kosche .................. G06F 8/443 717/158 |
| 2008/0229068 | A1* | 9/2008 | Bose ...................... G06F 9/3802 712/205 |
| 2008/0271001 | A1* | 10/2008 | Nonomura ........... G06F 21/125 717/143 |
| 2009/0254892 | A1 | 10/2009 | Yamashita |
| 2013/0132961 | A1* | 5/2013 | Lehavi .................. G06F 9/5027 718/102 |
| 2013/0198729 | A1* | 8/2013 | Turner .................... G06F 8/443 717/151 |

(Continued)

FOREIGN PATENT DOCUMENTS

| JP | 6-187309 | 7/1994 |
| JP | 6-250988 | 9/1994 |

(Continued)

*Primary Examiner* — Daxin Wu
(74) *Attorney, Agent, or Firm* — Staas & Halsey LLP

(57) ABSTRACT

A computer configured to perform compiling, including a memory configured to store a source program and a processor, the processor is configured to execute a method which includes; compiling the source program, wherein a number of cycles desired for executing each function included in the source program and information indicating a call relationship between a task and a function called by the task are generated, and performing link processing, wherein a number of cycles desired for executing each task based on the number of cycles desired for executing each function and the call relationship.

11 Claims, 21 Drawing Sheets

(56) References Cited

U.S. PATENT DOCUMENTS

| | | | |
|---|---|---|---|
| 2013/0227531 A1* | 8/2013 | Vijayaraghavan | ............................ G06F 11/3624 717/130 |
| 2013/0346953 A1* | 12/2013 | Chen | ......................... G06F 8/48 717/151 |
| 2014/0007043 A1* | 1/2014 | Aliseychik | ............ G06F 9/4881 717/106 |

FOREIGN PATENT DOCUMENTS

| | | | |
|---|---|---|---|
| JP | 2003177943 A | * | 6/2003 |
| WO | WO 2008/072334 A1 | | 6/2008 |

* cited by examiner

FIG. 2

```
1   #include <omp.h>
2   extern void func1(void);
3   extern void func2(void);
4   int main(void) {
5   #pragma omp parallel num_threads(2)
6     {
7       omp_set_nested(1);
8       if(omp_get_thread_num() == 0){
9   #pragma omp parallel num_threads(4)
10        {
11          func1();
12        }
13      }else if(omp_get_thread_num() == 1){
14  #pragma omp parallel num_threads(4)
15        {
16          func2();
17        }
18      }
19    }
20    return 0;
21  }
```

DEFINITION POINTS OF TASK α (lines 10–12)

DEFINITION POINTS OF TASK β (lines 15–17)

FIG. 3

```
1  static int a[1000], b[10];
2  void func1(void) {
3    for (int i = 0; i < 1000; i++) a[i] = i;
4  }
5  void func2(void) {
6    for (int i = 0; i < 10; i++) b[i] = i;
7  }
```

FIG. 7

```
1   #include <omp.h>
2   extern void func1(const int*, int*);
3   extern void func2(const int*, int*);
4   int main(void) {
5     int input[100],a_out[100],b_out[100],output[100];
6     int i;
7   #pragma omp parallel num_threads(2)
8     {
9       omp_set_nested(1);
10      if (omp_get_thread_num() == 0) {
11  #pragma omp parallel  num_threads(4) //threads number of TASK A
12        {
13          func1(input, a_out);
14        }
15      } else if (omp_get_thread_num() == 1) {
16  #pragma omp parallel num_threads(2) //threads number of TASK B
17        {
18          func2(input, b_out);
19        }
20      }
21    }
22    for (i = 0; i < 100; i++) output[i] = (a_out[i] + b_out[i])/2;
23    return 0;
24  }
```

FIG. 8A

```
1  void func1(const int *in, int *out) {
2    int i;
3    for(i = 0; i < 100; i++) {      // LOOP THAT CAN BE PARALLELIZED
4      ... = in[i];
5      out[i] = ...;
6    }
7  }
```

FIG. 8B

```
1  void func2(const int *in, int *out) {
2    int i;
3    for(i = 0; i < 100; i++) {      // LOOP THAT CAN BE PARALLELIZED
4      ... = in[i];
5      out[i] = ...;
6    }
7    ... =func3();
8  }
```

FIG. 8C

```
1  int func3(void) {
2    ...;
3    for(i = 0; i < 1000; i++) {     // LOOP THAT MAY NOT BE PARALLELIZED
4      ...;
5    }
6  }
```

FIG. 9A

| | |
|---|---|
| 1 | [HEAD OF TASK] |
| 2 | call ... |
| 3 | [TAIL OF TASK] |
| 4 | [HEAD OF TASK] |
| 5 | call ... |
| 6 | [TAIL OF TASK] |

FIG. 9B

| | |
|---|---|
| 1 | [HEAD OF LOOP (INITIAL VALUE 0 OF LOOP VARIABLES, FINAL VALUE 99)] |
| 2 | load ... |
| 3 | add ... |
| 4 | store ... |
| 5 | [TAIL OF LOOP] |

FIG. 17

| TASK COST TABLE | | 132 |
|---|---|---|
| TASK | COST | |
| TASK A | (2100/n) + 2 | |
| TASK B | (10000/m) + 10 | |

FIG. 18

| (n, m) | COST OF TASK A | COST OF TASK B |
|---|---|---|
| (n=1, m=1) | 2102 | 10010 |
| (n=1, m=2) | 2102 | 5010 |
| (n=1, m=3) | 2102 | 3344 |
| (n=1, m=4) | 2102 | 2510 |
| (n=1, m=5) | 2102 | 2010 |
| (n=2, m=5) | 1052 | 2010 |
| (n=2, m=6) | 1052 | 1677 |

FIG. 19A

```
1   .global task 001
2   mov         %register1, %register2
3   ...
4   callq       RUN TIME GENERATING TASK
5   ...
6   .global task 002
7   mov         %register1, %register2
8   ...
9   callq       RUN TIME GENERATING TASK
10  ...
```

FIG. 19B

```
1   .global task 001
2   mov         2, %register2
3   ...
4   callq       RUN TIME GENERATING TASK
5   ...
6   .global task 002
7   mov         6, %register2
8   ...
9   callq       RUN TIME GENERATING TASK
10  ...
```

FIG. 23

```
1   #pragma omp parallel num_threads(3)
2   #pragma omp task
3   #pragma omp parallel num_threads(6)
4   {
5   <TASK1>
6   }
7   #pragma omp task
8   #pragma omp parallel num_threads(4)
9   {
10  <TASK2>
11  }
12  #pragma omp task
13  #pragma omp parallel num_threads(2)
14  {
15  <TASK3>
16  }
```

COMPUTER THAT PERFORMS COMPILING, COMPILER PROGRAM, AND LINK PROGRAM

CROSS-REFERENCE TO RELATED APPLICATION

This application is based upon and claims the benefit of priority of the prior Japanese Patent Application No. 2015-121358, filed on Jun. 16, 2015, the entire contents of which are incorporated herein by reference.

FIELD

The embodiments discussed herein relate to a computer that performs compiling, a compiler program, and a link program.

BACKGROUND

In a case of developing computer software, a developer usually uses a high-level language such as a C language as a programming language. Source code written by the high-level language may be converted into an object code by using a compiler. The object code may be executed by a processor. In addition, an object file that includes the object code and another object file or a library which are referred to from the object code are linked by a linker, and then, an executable file may be generated.

By executing some processes written in the program in parallel, it is possible to accelerate processing. For example, there is a proposal in which a conditional expression within the loop determined to be executable in parallel is recognized based on a dependency between a control structure of a loop of an execution statement and data, a condition for satisfying the conditional expression is obtained before a task for parallel execution is generated, and then, the loop is modified to a loop that executes the task under the execution condition in parallel. In addition, there is also a proposal in which the number of processors is assigned to each parallel processing based on an amount of processing data per unit time of each parallel processing and an amount of input data per unit time such that an execution end time of each processing becomes equal.

Furthermore, there is also a proposal in which a scheduling code that controls execution order or a start time of the task is inserted into the object code in order to realize the high-speed execution of the entirety of tasks.

Japanese Laid-open Patent Publication No. 6-250988, Japanese Laid-open Patent Publication No. 6-187309, and International Publication Pamphlet No. WO 2008/072334 are examples of the related art.

In a case of executing a plurality of tasks in parallel, it is conceivable to grasp the number of clock cycles (or simply referred to as the number of cycles) desired for the execution of each task. For example, an assignment of a processing capability (for example, the number of threads) may be performed on each task according to the number of cycles. However, in some cases, a definition of the task or a definition of a function called from the task is written in another source file. In this case, since the compiling is performed for each source file, it is difficult for the compiler to determine the number of cycles of each task including the number of cycles of the function.

According to an aspect of the embodiments, the embodiments discussed herein aim to provide a computer that appropriately acquires the number of cycles of each task, a compiler program, and a link program and a compiling method.

SUMMARY

According to an aspect of the invention, a computer configured to perform compiling, including a memory configured to store a source program and a processor, the processor is configured to execute a method which includes; compiling the source program, wherein a number of cycles desired for executing each function included in the source program and information indicating a call relationship between a task and a function called by the task are generated, and performing link processing, wherein a number of cycles desired for executing each task is calculated based on the number of cycles desired for executing each function and the call.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a first source program;

FIG. 3 is a diagram illustrating an example of a second source program;

FIG. 7 is a diagram illustrating an example (part 1) of a source program;

FIGS. 8A to 8C are diagrams illustrating examples (part 2) of the source program;

FIGS. 9A and 9B are diagrams illustrating examples of an instruction sequence to functions;

FIG. 17 is a diagram illustrating an example of a task cost table;

FIG. 18 is a diagram illustrating an example of determining the number of threads;

FIGS. 19A and 19B are diagrams illustrating an example of setting the number of threads;

FIG. 23 is a diagram illustrating another example of a source program; and

DESCRIPTION OF EMBODIMENTS

Hereinafter, the present embodiments are described with reference to the drawings.

First Embodiment

Figure 1:
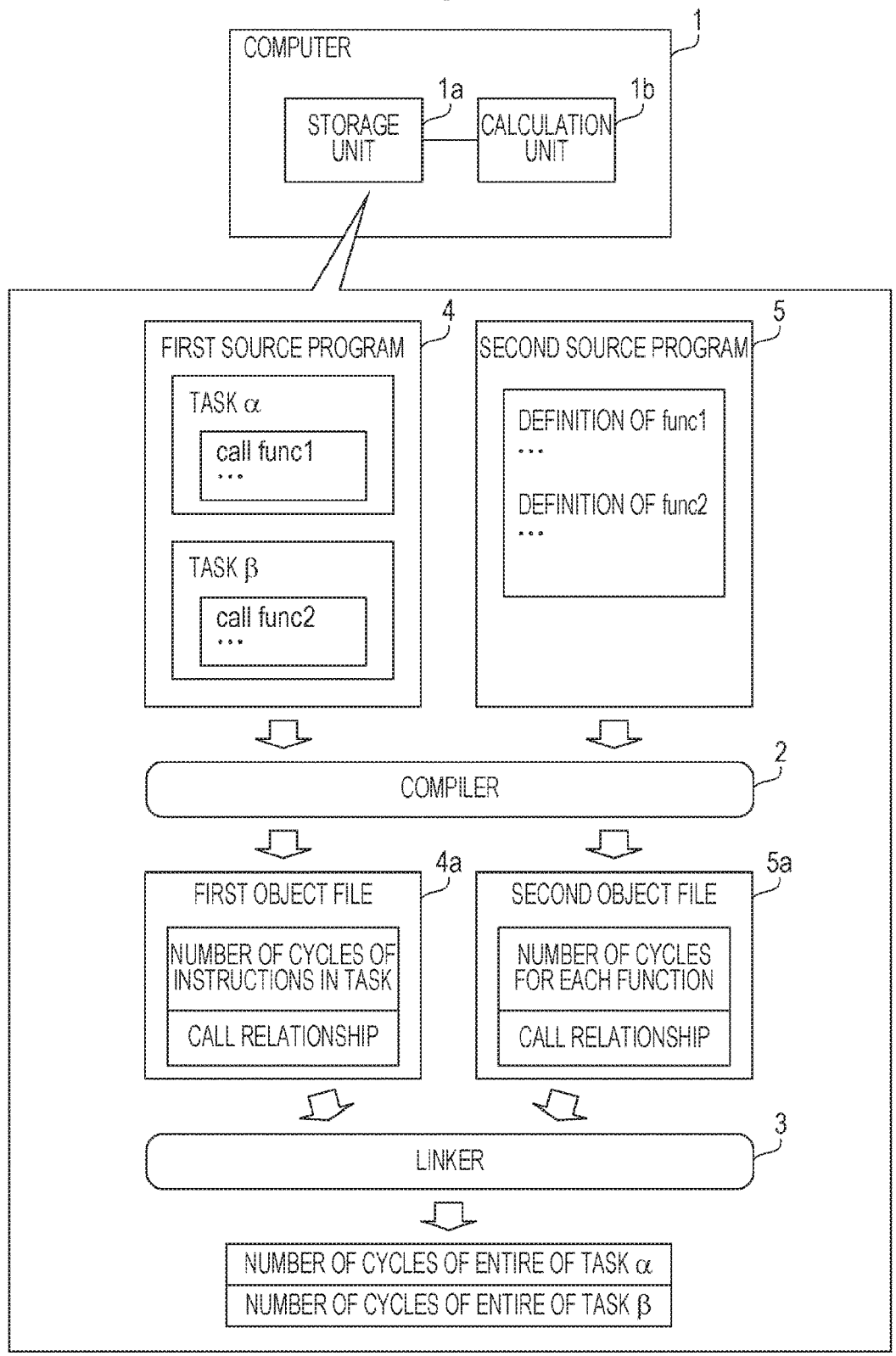
FIG. 1 is a diagram illustrating a computer in a first embodiment.

FIG. 1 is a diagram illustrating a computer in a first embodiment.

A computer 1 compiles a source program (sometimes, referred to as source code) and generates an object code. For example, the computer 1 compiles a first source program 4 and generates a first object file 4a. The first object file 4a includes an object code with respect to the first source program 4. In addition, the computer 1 compiles a second source program 5 and generates a second object file 5a. The second object file 5a includes an object code with respect to the second source program 5. The second source program 5 is included in a source program file (also referred to as a source file) which is different from that of the first source program 4.

The computer 1 includes a storage unit is and a calculation unit 1b. The storage unit is may be a volatile storage device such as a random access memory (RAM) or may be a non-volatile storage device such as a hard disk drive (HDD) or any other type of a memory. The calculation unit 1b is, for example, a processor. The processor may be a central processing unit (CPU) or may be a digital signal processor (DSP), and may include an integrated circuit such as an application specific integrated circuit (ASIC) or a field programmable gate array (FPGA). The processor executes, for example, a program stored in the RAM. A program that realizes the compiling processing described below may be called a compiler program. In addition, a program that realizes link processing described below may be called a link program. In addition, the "processor" may be a collection of two or more processors (a multi-processor).

The storage unit is stores the source program. The source program may be a program input to the computer 1 from a user, or may be a program received by the computer 1 from another computer via a network.

The calculation unit 1b executes the compiling processing. Specifically, the calculation unit 1b acquires the source program from the storage unit 1a, and compiles the source program, and then, generates an object file. The object file includes object codes corresponding to the source program. The calculation unit 1b may store the generated object file in the storage unit is or may store the generated object file in another computer or an external storage apparatus via the network. The calculation unit 1b performs the compiling for each source file. For example, the calculation unit 1b may exert the function of a compiler 2 that executes the compiling processing by executing the compiler program.

The calculation unit 1b executes link processing. Specifically, the calculation unit 1b links the generated object file and another object file referred to from the object code or the library, and then, generates the executable file. For example, the calculation unit 1b may exert a function of a linker 3 that executes the link processing by executing the link program.

When compiling the source program, the calculation unit 1b generates information indicating the number of clock cycles (sometimes, simply referred to as the number of cycles) desired for the execution of each function included in the source program and the call relationship between the task and the function. The function may be a so-called routine (there may be a call relationship that the main routine calls a sub-routine).

For example, a case is considered where the calculation unit 1b compiles the first source program 4. The first source program 4 includes definitions of task α and task β which are tasks that may be executed in parallel (sometimes, called parallel tasks). For example, the calculation unit 1b may specify the parallel tasks α and β by specifying a fixed form of syntax included in the first source program 4. For example, the task α includes a code "call func1" that calls a function func1. For example, the task β includes a code "call func2" that calls a function func2. The definitions of the functions func1 and func2 are written in the second source program 5.

The calculation unit 1b acquires the number of cycles desired for executing the instruction included in the defined position of each of the tasks α and β. For example, the storage unit 1a may store the information on the number of cycles desired for executing each instruction in the object code in advance. Then, the calculation unit 1b may obtain the total of the numbers of cycles for the instructions in the tasks existing immediately under the task α based on the information (in a case where the loop is included, the number of rotations of the loop may be considered). However, since the definition of the function func1 exists in the second source program 5, the number of cycles in which the number of cycles of the function func1 is also summed may not be obtained. In addition, the calculation unit 1b may obtain the total of the number of cycles for the instructions in the tasks existing immediately under the task β. However, since the definition of the function func2 exists in the second source program 5, the number of cycles in which the number of cycles of the function func2 is also summed may not be obtained.

In addition, for example, the calculation unit 1b specifies the call relationships between the tasks α and β and the functions func1 and func2. As described above, a code for calling the function func1 is included in the task α. Accordingly, the calculation unit 1b obtains a call relationship indicating that the task α calls the function func1. In addition, a code for calling the function func2 is included in the task β. Accordingly, the calculation unit 1b obtains a call relationship indicating that the task β calls the function func2. The calculation unit 1b may include the information on the number of cycles of the instructions in the tasks α and β and the call relationships between the tasks α and β and the functions func1 and func2 in the first object file 4a.

Next, a case is considered where the calculation unit 1b compiles the second source program 5. The second source program 5 includes the definitions of the functions func1 and func2. For example, the calculation unit 1b may specify the defined positions of the functions func1 and func2 by specifying a fixed form of syntax included in the second source program 5. The calculation unit 1b acquires the number of cycles desired for executing the instruction included in the defined position of the function func1. The calculation unit 1b acquires the number of cycles desired for executing the instruction included in the defined position of the function func2. As described above, the calculation unit 1b may calculate the number of cycles of the functions func1 and func2 based on the information on the number of cycles desired for executing each instruction of the object code. Each of the functions func1 and func2 does not include the code that calls another function. Therefore, the calculation unit 1b obtains, as the call relationship, information indicating that another function is not called from each of the functions func1 and func2. However, another function may further be called from each of the functions func1 and func2. The calculation unit 1b may include in the second object file 5a the information on the number of cycles and a call relationship acquired regarding the functions func1 and func2.

The compiling processing on the first source program 4 and the second source program 5 described above may be executed by the compiler 2 realized by the calculation unit 1b.

When performing the link processing, the calculation unit 1b calculates the number of cycles desired for executing each task based on the information on the number of cycles and a call relationship generated at the time of compiling. For example, a case is considered where the calculation unit 1b links the first object file 4a and the second object file 5a, and generates the executable file.

For example, the calculation unit 1b acquires the number of cycles of the instructions in the task α from the first object file 4a. In addition, the calculation unit 1b acquires from the first object file 4a the call relationship indicating that the function func1 is called from the task α. Then, for example, the calculation unit 1b acquires the number of cycles of the function func1 from the second object file 5a. The calculation unit 1b sets the sum of the numbers of cycles acquired from the first object file 4a and the second object file 5a regarding the task α and the function func1, to be the numbers of cycles (may be referred to as the numbers of cycles of entirety of tasks α) desired for executing the task α.

Similarly, for example, the calculation unit 1b acquires the number of cycles of the instructions in the task β from the first object file 4a. In addition, the calculation unit 1b acquires from the first object file 4a the call relationship indicating that the function func2 is called from the task β. Then, for example, the calculation unit 1b acquires the number of cycles of the function func2 from the second object file 5a. The calculation unit 1b sets the sum of the numbers of cycles acquired from the first object file 4a and the second object file 5a regarding the task β and the function func2, to be the numbers of cycles (may be referred to as the numbers of cycles of entirety of tasks β) desired for executing the task β.

The link processing on the first object file 4a and the second object file 5a described above may be executed by the linker 3 realized by the calculation unit 1b. In this way, with regard to the task α, the calculation unit 1b may acquire the entire number of cycles including the number of cycles of the call destination function func1. In addition, with regard to the task β, the calculation unit 1b may acquire the entire number of cycles including the number of cycles of the call destination function func2.

FIG. 2 is a diagram illustrating an example of a first source program. In FIG. 2, a case of writing the first source program 4 using the C language is illustrated as an example. In the source program, the task may be designated by a predetermined instruction statement. As the instruction statement, for example, a syntax of an openMP® may be used. In the example in FIG. 2, a sample code expressing two parallel tasks of which the numbers of threads are respectively four and four is illustrated in openMP. In FIG. 2, numbers on the left side are line numbers (in the drawings hereinafter, the line numbers may be given similarly). The parallel tasks equal to or more than three may be similarly expressed.

For example, the 10th to 12th lines are the defined positions of the task α. In addition, the 15th to 17th lines are the defined positions of the task β. The defined position of each task may include an execution statement or loop syntax including the execution statement, and a function call. Each task is defined in the function. In addition, sometimes, another function is called in the function, which becomes the nested class.

FIG. 3 is a diagram illustrating an example of the second source program. In FIG. 3 also, similarly to FIG. 2, a case of writing the second source program 5 using the C language is illustrated as an example. The second source program 5 includes each of the definitions of the functions func1 and func2.

When starting the execution of the parallel tasks using the executable file, the execution is performed by starting up the threads. Here, a case where one thread is executed for each core of the processor is considered. In this case, depending on the number of cores assigned to tasks that may be executed in parallel, there is a case where the execution of a certain task ends earlier than the execution of another task. Then, the core of which the execution of the task has ended waits for the ending of the execution of another task. Thus, the core does not execute any processing and the state becomes the empty state. Therefore, it is not efficient.

For example, in order to efficiently execute the parallel tasks, it is desirable to perform the assignment of the number of cores to each task in such a manner that the execution time of each task is equalized. As information for performing the assignment of the number of cores, the cost (number of cycles) of each task and a parallel execution possibility may be considered. However, generally, the program may include a plurality of source files. In this case, at the time of compiling, it is difficult to obtain the number of cycles of all the tasks. It is because the compiler 2 may not know the number of cycles in the function if the call destination function of a certain task is defined in a different source file since the compiling is performed for each source file. In order to summarize the function called from the task in one file, a method may be considered in which a plurality of source files is linked to one file and compiled. However, in this method, each time a modification is performed on a part of the program, the linked file is compiled again. Thus, the time and effort increase. Furthermore, if each source file is summarized in one file, the file size increases. Thus, the load of memory usage increases.

For example, as illustrated in FIG. 2 and FIG. 3, in the program including the parallel tasks and configured with a plurality of source files, a part where the number of threads of the task is assigned and a definition part of the task are present in a separate file. Specifically, the task α calls the function func1. The function func1 includes a loop of 1000 rotations. The task β calls the function func2. The function func2 includes a loop of 10 rotations. There is a difference in costs between the two. If both the tasks α and β are executed in the same number of threads, the task β in which the loop of 10 rotations is executed ends earlier, and waits for the ending of the task α in which the loop of 1000 rotations is executed. In this case, if the number of threads assigned to the task α including the loop of 1000 rotations is more than that of the task β, the waiting time may be shortened which results in high efficiency. However, since the compiler performs compiling for each file, it is difficult to analyze the cost of the straddling task between the files. Therefore, it is difficult to automatically adjust the number of threads according to the cost of each task.

Here, when compiling the source program, the computer 1 generates the information indicating the number of cycles desired for executing each function included in the source program and the call relationship between the tasks and the functions. At the time of link processing, the computer 1 calculates the number of cycles desired for executing each task based on the number of cycles and a call relationship. For example, the computer 1 adds the generated information on the number of cycles and the call relationship to the object file. At the time of link processing, the computer 1 may appropriately acquire the number of cycles for each task based on the information on the number of cycles included in each object file and the call relationship. As a result, the computer 1 performs the assignment of the number of threads to each task based on the acquired number of cycles of each task.

Second Embodiment

An information processing apparatus in a second embodiment generates an executable code from source code written in a high-level language such as C language using a compiler and a linker.

Figure 4:
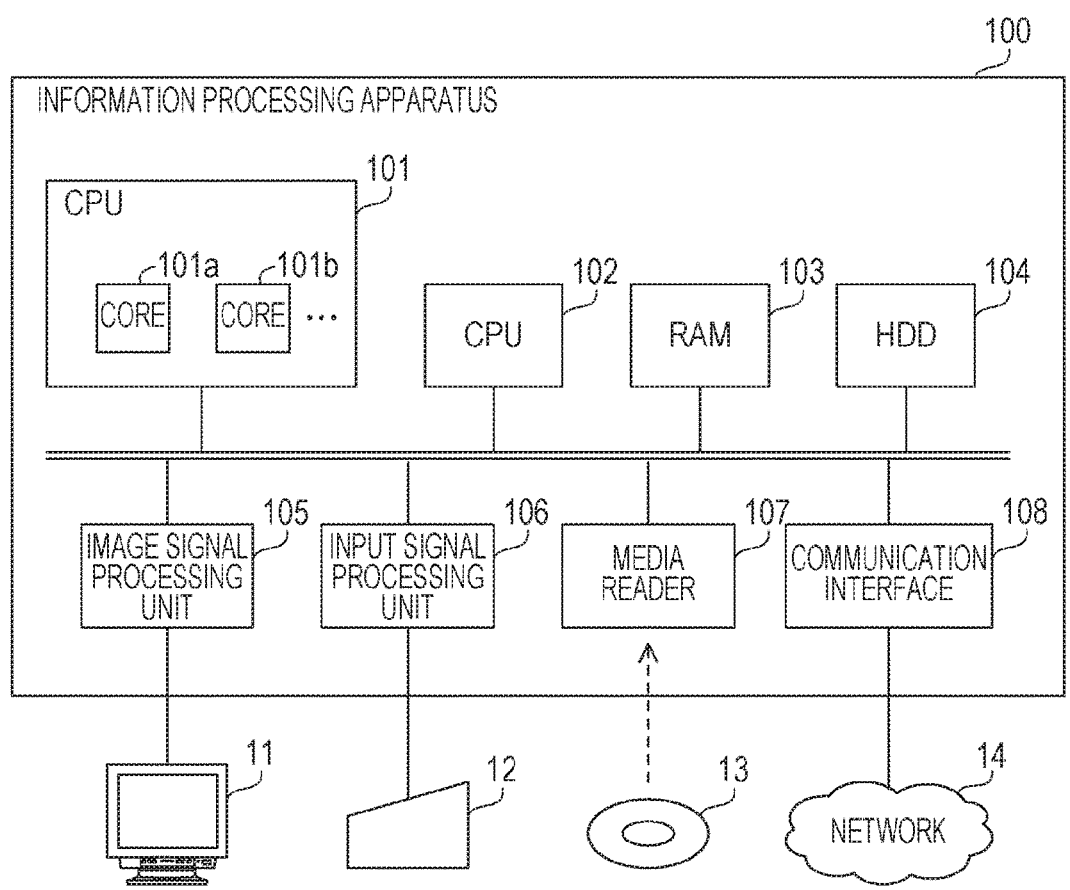
FIG. 4 is a diagram illustrating an example of hardware of an information processing apparatus in a second embodiment.

FIG. 4 is a diagram illustrating an example of hardware of information processing apparatus in the second embodiment. The information processing apparatus 100 includes CPUs 101 and 102, a RAM 103, an HDD 104, an image signal processing unit 105, an input signal processing unit 106, a media reader 107, and a communication interface 108. These hardware units are connected to a bus in the information processing apparatus 100. The CPUs 101 and 102 are examples of the calculation unit 1b in the first embodiment, and the RAM 103 or the HDD 104 is an example of the memory or the storage unit is in the first embodiment.

The CPUs 101 and 102 are processors including one or more cores that execute instructions in a program. For example, the CPU 101 has a plurality of cores including a core 101a and a core 101b. The plurality of cores belonging to the same or different CPUs may execute instructions in parallel each other. The CPUs 101 and 102 load at least a part of the program or data stored in the HDD 104 on the RAM 103, and execute the program. Each core may be called as a "processor", and a collection of a plurality of processors may be called as a "processor" (a multi-processor). The information processing apparatus 100 may further include one or more CPUs in addition to the CPUs 101 and 102. In addition, in an example in the second embodiment, a case of executing one thread per one core is considered, not a case of simultaneously executing a plurality of threads per one core.

The RAM 103 is volatile memory that temporarily stores the program executable by the CPUs 101 and 102 or the data usable for the calculation by the CPUs 101 and 102. The information processing apparatus 100 may include another type of memory other than the RAM or may include a plurality of memories.

The HDD 104 is a non-volatile storage device that stores a software program such as an operating system (OS) and application software and data. The information processing apparatus 100 may include another type of memory such as a flash memory or a solid state drive (SSD), or may include a plurality of non-volatile storage devices.

The image signal processing unit 105 outputs an image to a display 11 connected to the information processing apparatus 100 according to the instructions from the CPUs 101 and 102. As the display 11, a cathode ray tube (CRT) display, a liquid crystal display (LCD), a plasma display (PDP), an organic electro-luminescence (OEL) display, or the like may be used.

The input signal processing unit 106 acquires an input signal from an input device 12 connected to the information processing apparatus 100, and outputs the input signal to at least one CPU. As the input device 12, a pointing device such as a mouse, a touch panel, a touch pad or a track ball, and a keyboard, a remote controller, or a button switch may be used. In addition, a plurality of types of input device may be connected to the information processing apparatus 100.

The media reader 107 is a reading device that reads the program and the data stored in a recording medium 13. As the recording medium 13, for example, a magnetic disk such as a flexible disk (FD) or an HDD, an optical disk such as a compact disk (CD) or a digital versatile disk (DVD), a magneto-optical disk (MO), and a semiconductor memory may be used. The media reader 107 stores, for example, the program or the data read from the recording medium 13 in the RAM 103 or the HDD 104.

The communication interface 108 is an interface that is connected to a network 14 and performs a communication with another information processing apparatus via the network 14. The communication interface 108 may be a wired communication interface connected to a communication device such as a switch via a cable, or may be a wireless communication interface connected to a base station via a wireless link.

The number of CPUs included in the information processing apparatus 100 may be one. In addition, the information processing apparatus 100 may not include the media reader 107. In addition, in a case where the information processing apparatus 100 is controlled by a terminal device operated by a user via the network 14, the information processing apparatus 100 may not include the image signal processing unit 105 or the input signal processing unit 106. In addition, the information processing apparatus 100 may not include the communication interface 108. In addition, the display 11 or the input device 12 may be integrally formed in the housing of the information processing apparatus 100.

Figure 5:
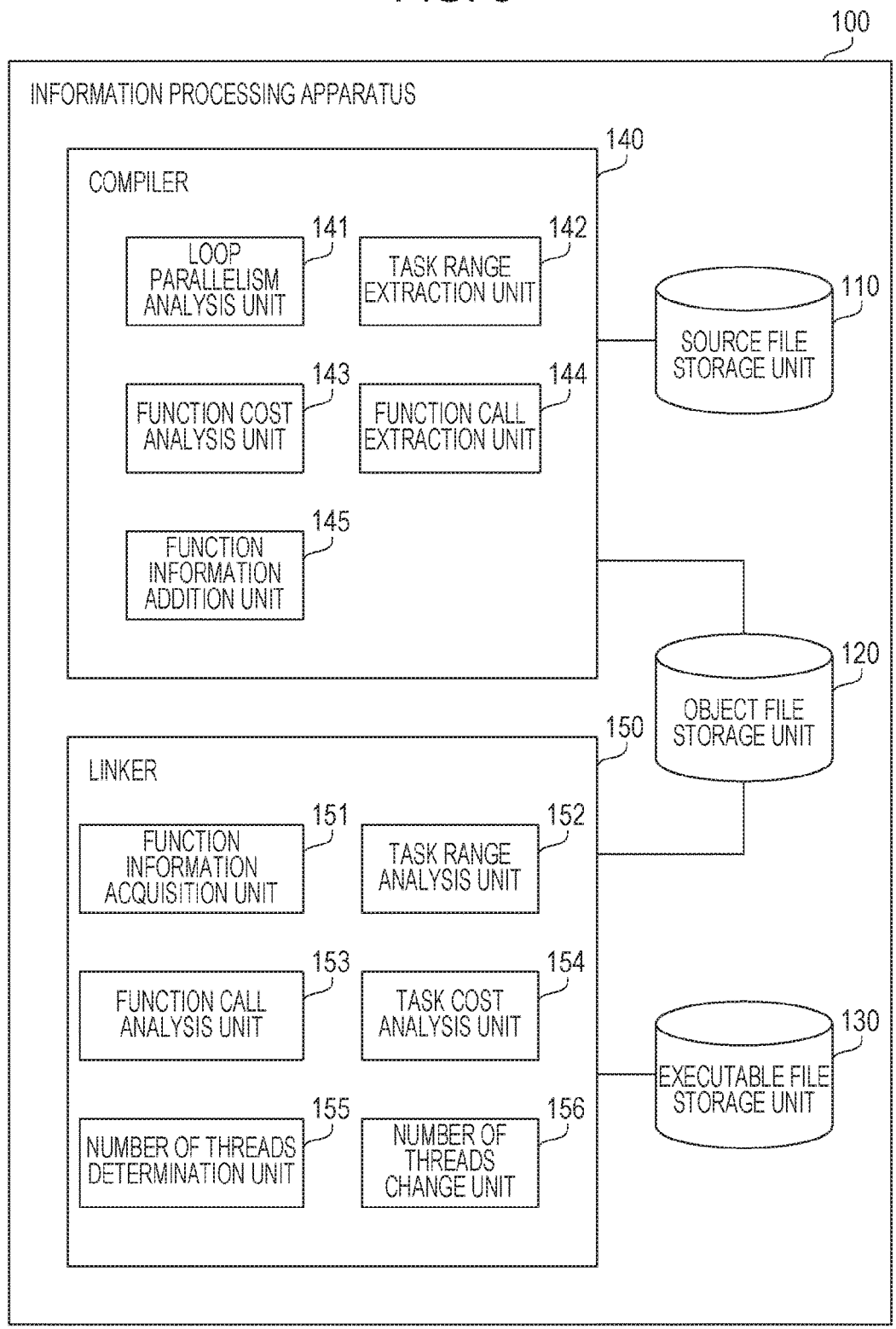
FIG. 5 is a diagram illustrating an example of software of the information processing apparatus.

FIG. 5 is a diagram illustrating an example of software of the information processing apparatus. The information processing apparatus 100 includes a source file storage unit 110, an object file storage unit 120, an executable file storage unit 130, a compiler 140, and a linker 150. The source file storage unit 110, the object file storage unit 120, and the executable file storage unit 130 are implemented as storage regions prepared in the RAM 103 or the HDD 104. The compiler 140 and the linker 150 are implemented as software modules executable by the CPUs 101 and 102.

The source file storage unit 110 stores a source file. The source file is a file including a source program (also referred to as source code) written using a high-level language such as a C language. The source file may be created by the user using the input device 12, or may be transmitted from another information processing apparatus to the information processing apparatus 100 via the network 14.

The object file storage unit 120 stores an object file. The object file is a file including an object code written using a machine language which may be directly understood by the CPU. The object code is created by compiling the source program.

The executable file storage unit 130 stores an executable file. The executable file is a program module having an executable format and is created from the object file. Sometimes, the executable file is created by linking a plurality of object files. The executable file may be executed by the information processing apparatus 100, or may be transmitted to another information processing apparatus and executed by the information processing apparatus.

The compiler 140 acquires the source file from the source file storage unit 110, and compiles the source program included in the source file. Then, the compiler 140 generates an object code corresponding to the source program and stores the object file including the generated object code in the object file storage unit 120. The compiler 140 includes a loop parallelism analysis unit 141, a task range extraction unit 142, a function cost analysis unit 143, a function call extraction unit 144, and a function information addition unit 145.

The loop parallelism analysis unit 141 analyzes the source program and specifies the loop processing in the function, based on a calculation instruction and order of the calculation instruction included in the source program. The loop parallelism analysis unit 141 determines whether or not the parallel processing is possible for each time the loop processing is repeated, and generates loop parallelism information that indicates whether or not the parallel processing is possible for each time the loop processing is repeated, and then stores the information in the RAM 103. For example, in a case where it is possible to independently execute each processing which is repeatedly executed in loop (for example, in cases of being not affected by the result of previous processing, not affecting the result of next processing, or the like), the loops may be executed in parallel. Specifically, in a case where there is a loop of 100 rotations, 50 rotations from 1 to 50 and the other 50 rotations from 51 to 100 may be executed in parallel by two different threads (the loop may also be executed in parallel by three or more threads).

The task range extraction unit 142 analyzes the source program and grasps a start and end position of the task operated in parallel designated by, for example, the openMP instruction statement. In addition, the task range extraction unit 142 inserts a label immediately before the number of threads designation instruction in an instruction sequence in the object file generated with respect to the source program. The label is used for making it possible to identify by the linker 150 the execution point of the parallel tasks. The task range extraction unit 142 extracts the start and end position of the parallel tasks and the label name as the task range information, and stores the information in the RAM 103.

The function cost analysis unit 143 estimates the cost of the function. In a case where the tasks are detected by the task range extraction unit 142, the function cost analysis unit 143 estimates the cost of each detected task range. The cost is a sum of the number of clock cycles desired for the execution of each instruction included in the instruction sequence corresponding to the function of the source program or the task range. The number of clock cycles may be simply referred to as the number of cycles. Here, for example, information on a correspondence relationship between the instruction and the number of cycles is stored in advance in the object file storage unit 120. The function cost analysis unit 143 may specify the number of cycles of each instruction based on the information on the correspondence relationship.

In a case of the loop, the cost of the loop is a value obtained by multiplying the cost of the instruction sequence in the loop by the number of rotations of the loop. In a case where the number of rotations of loop is unknown, using a method disclosed in Japanese Laid-open Patent Publication No. 2006-293768, the number of elements in the array that appears in the loop or a fixed value (for example, 100 or the like) may be used. In a case where the fact that the target loop may be parallelized is indicated in the loop parallelism information, the function cost analysis unit 143 allows a value obtained by dividing the cost obtained by the above-described method by the number of threads to be the cost of the loop. Therefore, the cost has a value of assigned number of threads as a parameter. The function cost analysis unit 143 stores the obtained cost in the RAM 103 as the function cost information.

The function call extraction unit 144 analyzes the source program and extracts the function call relationships. The function call relationship includes the information on the function name and the number of calls. In a case where the task range is detected by the task range extraction unit 142, the function call extraction unit 144 extracts the function call relationships for each detected task. The function call extraction unit 144 stores the extracted information in the RAM 103 as the function call information.

The function information addition unit 145 adds the task range information generated by the task range extraction unit 142, the function cost information generated by the function cost analysis unit 143, and the function call information generated by the function call extraction unit 144 to the object file. However, the added task range information may be only the label name immediately before the number of threads designation instruction. Each information added to the object file is added in a unit of function or in a unit of task as described below.

The linker 150 acquires the object file from the object file storage unit 120 and searches for another object file or the library referred to from the object code included in the object file. Then, the linker 150 links the object file and another object file or the library, and generates an executable file and stores the executable file in the executable file storage unit 130. Here, the linker 150 performs the link processing using the object file which is a result of performing each processing by each unit described below. The linker 150 includes a function information acquisition unit 151, a task range analysis unit 152, a function call analysis unit 153, a task cost analysis unit 154, a number of threads determination unit 155 and a number of threads change unit 156.

The function information acquisition unit 151 acquires, from the entire object files to be linked, the task range information, the function cost information, and the function call information incorporated at the time of linking. The task range analysis unit 152 acquires the label name of the task from the task range information. In a case where the label name does not exist, since the parallel task does not exist, the analysis thereafter may not be executed (the executable file is generated as usual).

The function call analysis unit 153 builds the function call relationship from each task based on the function call information. The task cost analysis unit 154 analyzes the cost of each task. The task cost analysis unit 154 collects the entire cost of the functions called from the task, based on the function call relationship built by the function call analysis unit 153. The task cost analysis unit 154 expresses the total cost of the corresponding task in which the entire costs of the functions called from the corresponding task are taken into consideration while the number of threads being as the parameter.

Specifically, if the task name or the function name is t, and the number of executed threads is n, then the total cost of the task is expressed as AIIC(t, n). In addition, the cost that does not include the cost in the function called from the task or the function t is expressed as C(t, n). C(t, n) is the function cost information. At this time, if the function directly called from the task or the function t is func, then, AIIC(t, n) is expressed as C(t, n)+Σ {AIIC(func, n)×(number of calls of func from t)}. Here, Σ means summing the entire functions directly called from the task or the function t.

The number of threads determination unit 155 obtains the number of threads assigned to each task so that the difference in ending time of each task becomes small based on the analysis result for each task by the task cost analysis unit 154. Specifically, the number of threads determination unit 155 sets initial value of the number of threads of each task to be one. In a case where the total number of threads of the tasks is less than the number of usable cores, the total cost at the time when each task is executed by the currently assigned number of threads is obtained. Then, the number of threads determination unit 155 increases the number of threads of the task of which the total cost is the highest by one. By repeating the above-described processing until the total number of threads becomes equal number of usable cores, the number of threads of each task is obtained.

The number of threads change unit 156 rewrites the settings of the number of threads in the object file. The number of threads change unit 156 searches for the label name in the object file and changes the content of the immediately next instruction (instruction to designate the number of threads). That is, the number of threads change unit 156 changes the instruction to the register that determines the number of threads that starts the task in the instruction such that the value of the number of threads obtained by the number of threads determination unit 155 is assigned. The number of threads change unit 156 grasps in advance the information on what degree of changes may change the value of the number of threads with regard to the instruction to be changed.

Figure 6:
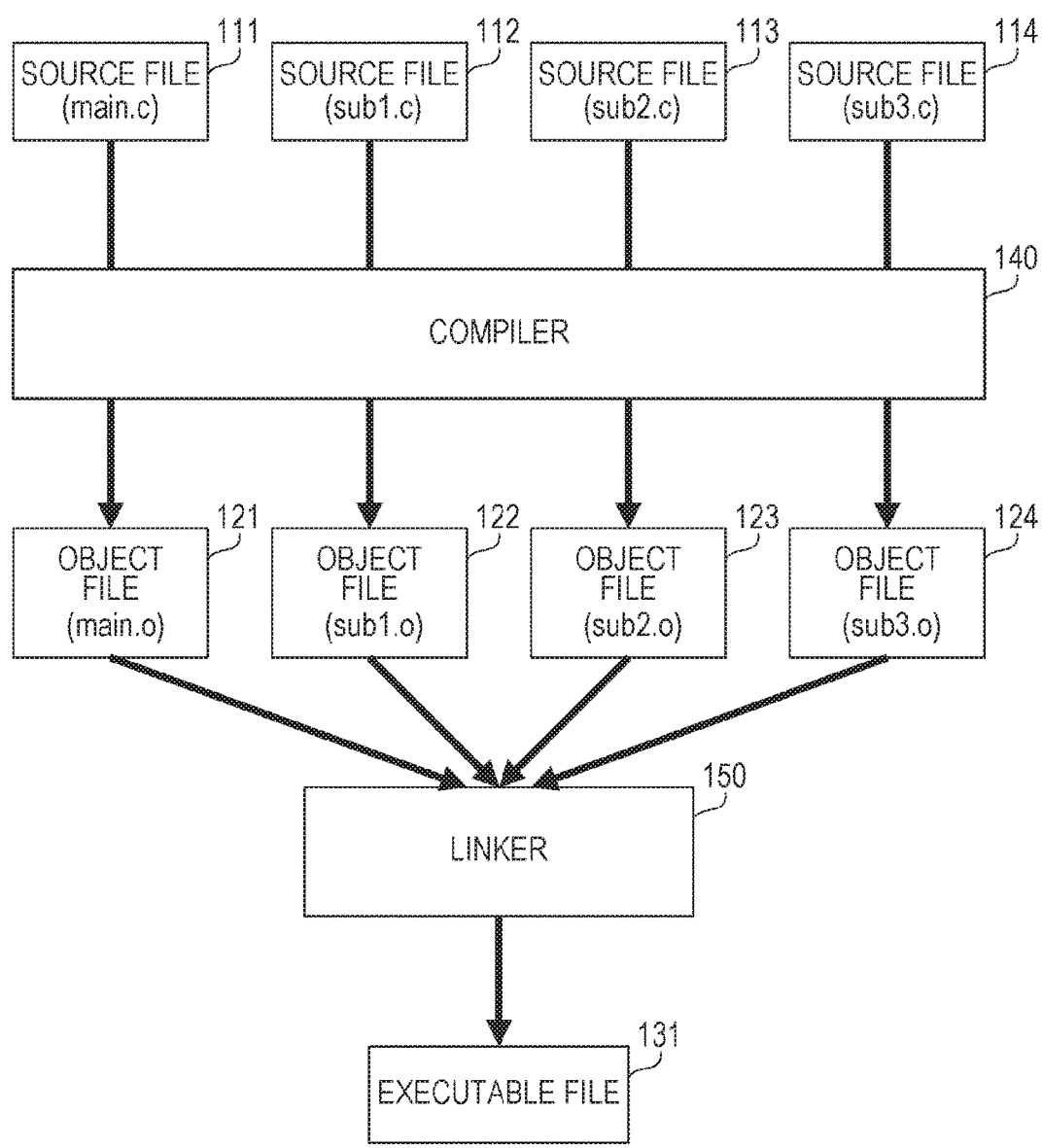
FIG. 6 is a diagram illustrating an example of files.

FIG. 6 is a diagram illustrating an example of the files. In the second embodiment, the following files are described as examples. Source files 111, 112, 113, and 114 are stored in the source file storage unit 110. A file name of the source file 111 is "main.c". A file name of the source file 112 is "sub1.c". A file name of the source file 113 is "sub2.c". A file name of the source file 114 is "sub3.c".

The compiler 140 compiles the source files 111, 112, 113, and 114, generates the object files 121, 122, 123, and 124, and stores the object files in the object file storage unit 120. The object file 121 is a result of compiling the source file 111. A file name of the object file 121 is "main.o". A file name of the object file 122 is "sub1.o". A file name of the object file 123 is "sub2.o". A file name of the object file 124 is "sub3.o".

The linker 150 links the object files 121, 122, 123, and 124, generates the executable file 131, and stores the executable file 131 in the executable file storage unit 130. Next, the source program included in the source files 111, 112, 113, and 114 are described as examples. Hereinafter, a case of writing in C language is described as an example.

FIG. 7 is a diagram illustrating an example (part 1) of a source program. For example, a function main is included in the source file 111. When compiling the source file 111, the loop parallelism analysis unit 141 searches for the loop that may be parallelized in the function main, but the loop that may be parallelized does not exist in the function main. Furthermore, the task range extraction unit 142 detects that the task is defined in the source file 111, and stores the start position and the end position. Specifically, in the source file 111, the first task is written in 12th line to 14th line and the second task is written in 17th line to 19th line. The first task is referred to as a task A. The second task is referred to as a task B. The "#pragma omp parallel num_threads(4)" written in 11th line of the source file 111 is a designation of the number of threads in the task A. The "#pragma omp parallel num_threads(2)" written in 16th line is a designation of the number of threads in the task B.

In this example, the tasks A and B may be executed in parallel, and it is written by the user who writes the source program that the task A is executed with the number of threads of 4 and the task B is executed with the number of threads of 2. However, the number of threads designated by the user may be adjusted by the information processing apparatus 100.

The task A includes a call of the function func1 ("func1 (input,a_out)" in 13th line). The task B includes a call of the function func2 ("func2(input,b_out)" in 18th line).

The function cost analysis unit 143 calculates the sum of the costs of each instruction included in the tasks A and B. In the example of FIG. 7, both the tasks A and B have only the cost of function call instruction. In addition, the function call extraction unit 144 generates the function call information that the function func1 is called from the task A and the function call information that the function func2 is called from the task B.

FIGS. 8A to 8C are diagrams illustrating an example (part 2) of the source programs. FIG. 8A illustrates an example of a source program included in the source file 112. FIG. 8B illustrates an example of a source program included in the source file 113. FIG. 8C illustrates an example of a source program included in the source file 114.

For example, the source file 112 includes a definition of the function func1. When compiling the source file 112, the loop parallelism analysis unit 141 searches for the loop that may be parallelized in the source file 112. The function func1 includes the loop that may be parallelized. The loop parallelism analysis unit 141 specifies that the loop in the function func1 may be parallelized.

The task range extraction unit 142 searches for the definition of the task and detects that the definition of the task does not exist in the function func1. The function cost analysis unit 143 calculates the cost of the function func1. At this time, the function cost analysis unit 143 sets the cost of the loop that may be parallelized as (the cost of the instruction in the loop)×number of rotations/n using the parameter n expressing the number of threads. The function func1 does not include another function call. Therefore, the function call extraction unit 144 detects from the function func1 that there is no another function call.

The source file 113 includes the definition of the function func2. The function func2 includes a loop that may be parallelized. When compiling the source file 113, similarly to the case of the source file 112, the loop parallelism analysis unit 141 determines that the loop in the function func2 may be parallelized. In addition, the task range extraction unit 142 searches for the definition of the task and detects that the definition of the task does not exist in the function func2. Similarly to the case of the source file 112, the function cost analysis unit 143 calculates the cost of the function func2. Furthermore, the function func2 includes the function call of the function func3. Therefore, the function call extraction unit 144 detects that there is a function call of the function func3 from the function func2.

The source file 114 includes the definition of the function func3. The function func3 includes a loop that may be parallelized. When compiling the source file 114, the loop parallelism analysis unit 141 specifies that the loop in the function func3 may not be parallelized. The task range extraction unit 142 searches for the definition of the task and detects that the definition of the task does not exist in the function func3. In addition, the function cost analysis unit 143 calculates the cost of the function func3. Since the loop in the function func3 may not be parallelized, the cost of the loop is set to be the cost of the instruction in the loop× number of rotations. Furthermore, the function func3 does not include another function call. Therefore, the function call extraction unit 144 detects from the function func3 that there is no other function calls.

FIGS. 9A and 9B are diagrams illustrating examples of instruction sequences to functions. FIG. 9A illustrates an example of the instruction sequence to the function main. FIG. 9B illustrates an example of the instruction to the function func1. These examples of the instructions may be considered to be a part of the object code generated by the compiler 140.

In FIG. 9A, for example, the instruction sequence to the function main includes the instruction sequence of each of the tasks A and B. For example, a head of the task and a tail of the task are specified by predetermined codes indicating the head of the task and the tail of the task. The first task range (from first line to third line in FIG. 9A) is the instruction sequence of the task A. The second task range (from fourth line to sixth line in FIG. 9A) is the instruction sequence of the task B. In this example, the tasks A and B include only the function call instruction as the instruction which becomes the target of the cost calculation. For example, the function call in the compiler 140 is expressed by a call instruction. Then, the number of cycles of the call instruction is the cost of the instruction in the tasks A and B.

In FIG. 9B, for example, the instruction sequence to the function func1 is loop processing in which the rotation number is 100. The loop of the function func1 is a loop that may be parallelized. For example, a head of the loop and a tail of the loop are specified by predetermined codes indicating the head of the loop and a tail of the loop. The loop executes three instructions such as a load instruction, an add instruction, and a store instruction. Then, the cost of the function func1 is a value obtained by multiplying the sum of the number of cycles of the load instruction, the number of cycles of the add instruction, and the number of cycles of the store instruction by 100 which is the number of rotations of the loop and then dividing the result by the number of threads n.

Figure 10:
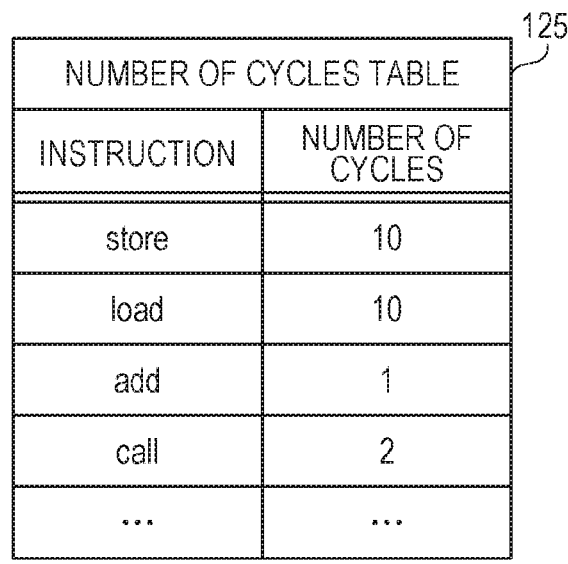
FIG. 10 is a diagram illustrating an example of the number of cycles table.

FIG. 10 is a diagram illustrating an example of the number of cycles table. The number of cycles table 125 is stored, for example, in the object file storage unit 120 in advance. The number of cycles table 125 has fields of instruction and the number of cycles.

In the field of instruction, the instruction is registered. In the field of the number of cycles, the number of cycles desired for the execution of the instruction is registered. For example, information that the instruction is "store" and the number of cycles is "10" is registered in the number of cycles table 125. This indicates that the number of cycles (the number of clock cycles) desired for execution of the store instruction is 10.

Figure 11:
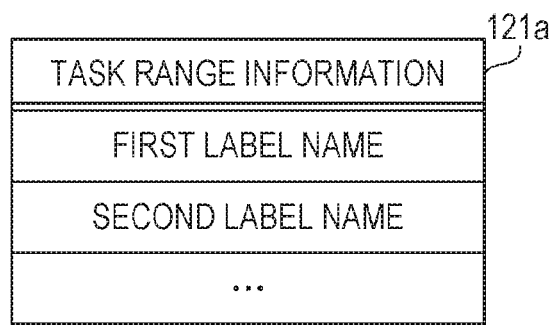
FIG. 11 is a diagram illustrating an example of task range information.

FIG. 11 is a diagram illustrating an example of task range information. Task range information 121a is an example of the task range information added to the object file 121. The task range information 121a includes the label name of the task A and the label name of the task B. In a case where the source file 111 includes equal to or more than three tasks, the task range information 121a includes equal to or more than three label names.

The object files 122, 123, and 124 also include similar task range information. However, in a case where the tasks are not detected in the source files 112, 113, and 114, no label name is included in the task range information (no setting).

Figure 12:
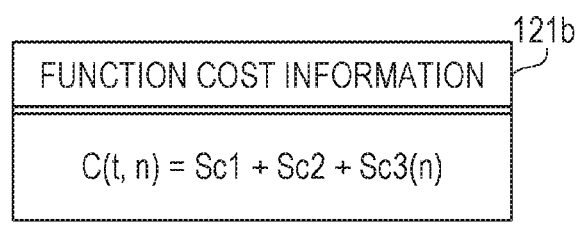
FIG. 12 is a diagram illustrating an example of function cost information.

FIG. 12 is a diagram illustrating an example of function cost information. Function cost information 121b is an example of the function cost information added to the object file 121. As described above, the function cost information 121b includes a cost C(t, n) that does not include the call destination function cost in the task or the function.

C(t, n) is expressed as C(t, n)=Sc1+Sc2+Sc3 (n). Sc1 is a sum of the numbers of cycles of the instructions other than the loops. Sc2 is a sum of the numbers of cycles of the instructions in loop which may not be parallelized×the number rotations of the loop. Sc3 is a sum of numbers of cycles of the instructions in loop which may be parallelized× the number rotations of the loop/n. n is a parameter indicating the number of threads.

In the example of the task A described above, the values are as follows. Since the task A includes only one call instruction as an instruction other than the loop, Sc1=2. Since the task A does not include the loop which may not be parallelized, Sc2=0. Since the task A does not include the loop that may be parallelized, Sc3=0. Accordingly, C (task A, n)=2+0+0/n=2.

The object files 122, 123, and 124 also include similar function cost information. For example, according to FIG. 9B and the example of the number of cycles table 125, the number of cycles of the load instruction is 10, the number of cycles of the add instruction is 1, and the number of cycles of the store instruction is 10. Therefore, in the function func1, Sc3(n) is expressed as Sc3(n)=(10+1+10)×100/n=2100/n. In addition, Sc1=Sc2=0. Accordingly, the function cost analysis unit 143 estimates the cost of the function func1 as C(func1, n)=2100/n. The function cost information on the function func1 is added to the object file 122.

The function cost analysis unit 143 may ignore the item which makes a low contribution to the cost (for example, if the item corresponding to Sc1 described above is minute compared to the item corresponding to Sc2 or Sc3, the item corresponding to Sc1 may be regarded as 0).

Figure 13:
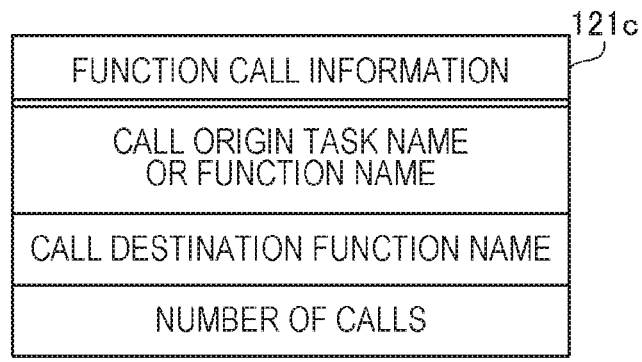
FIG. 13 is a diagram illustrating an example of function call information.

FIG. 13 is a diagram illustrating an example of the function call information. The function call information 121c is an example of the function call information added to the object file 121. The function call information 121c includes information on the call origin task name or the function name, the call destination function name and the number of calls. For example, in the task A, the function func1 is called one time. Therefore, the function call information 121c includes information that the call origin task name is "task A", the call destination function name is "func1", and the number of calls is "1". The objects file 122, 123, and 124 also include similar function call information. However, in a case where another function call is not included, information that there is no call is registered as the function call information.

Figure 14:
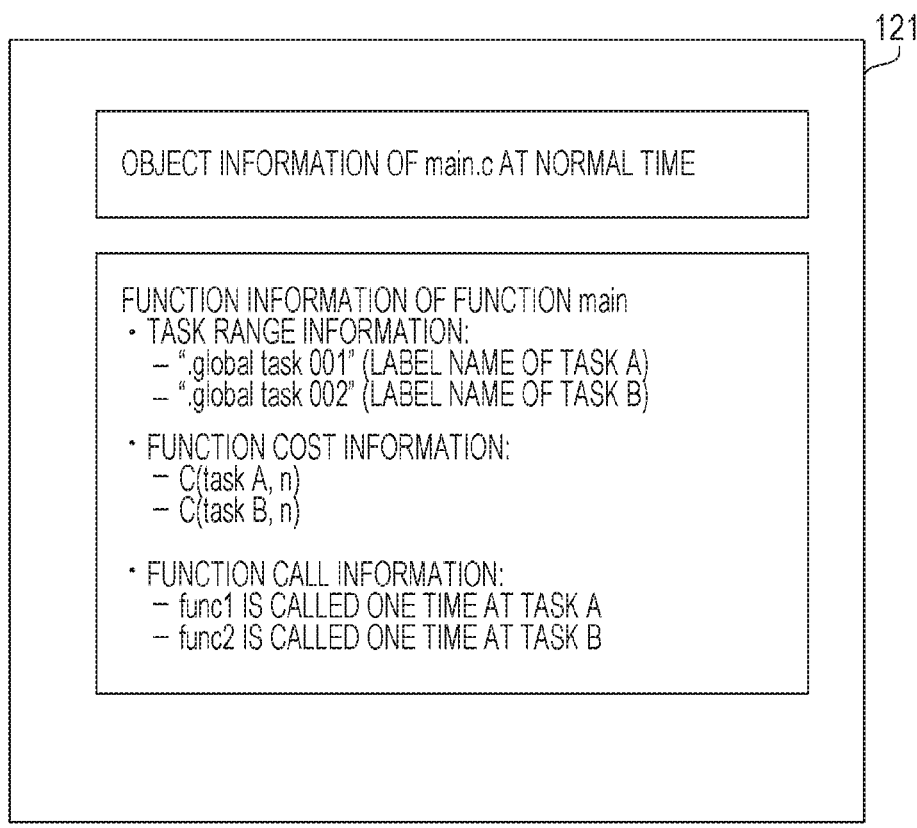
FIG. 14 is a diagram illustrating an example (part 1) of an object file.

FIG. 14 is a diagram illustrating an example (part 1) of the object file. The object file 121 includes function information on the function main in addition to the object information (information on the object code) of the main.c at the normal time. The function information on the function main includes the task range information (the task range information 121a), the function cost information (the function cost information 121b), and the function call information (the function call information 121c) described below.

The task range information includes the label name of the task A ".global task 001". The task range information includes the label name of the task B ".global task 002".

The function cost information includes the function cost information C(task A, n) regarding the task A. The function cost information includes the function cost information C(task B, n) regarding the task B.

The function call information includes information that "func1 is called one time at the task A". This information indicates that the task A calls function func1 one time. The function call information includes information that "func2 is called one time at the task B". This information indicates that the task B calls function func2 one time.

Figure 15:
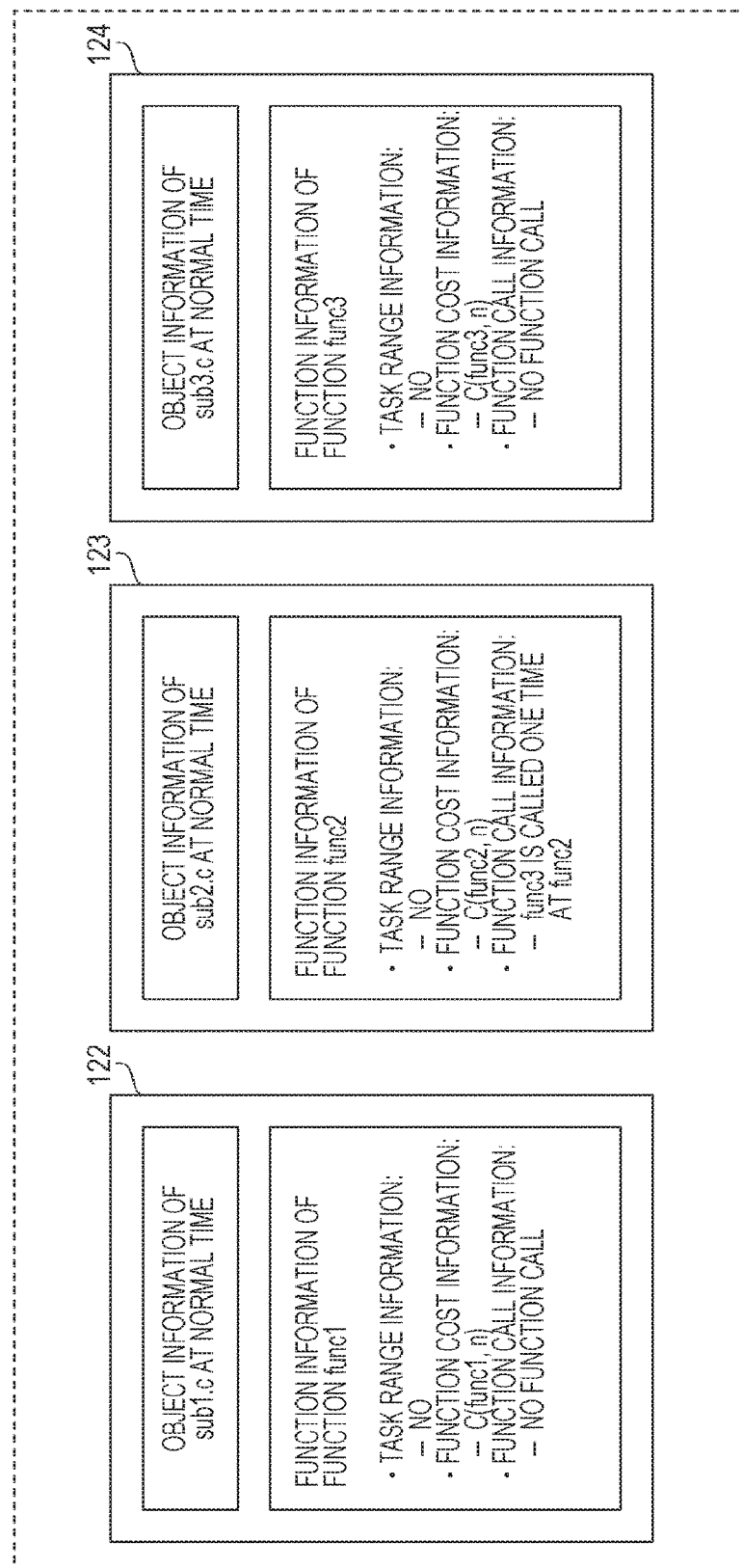
FIG. 15 is a diagram illustrating the example (part 2) of the object file.

FIG. 15 is a diagram illustrating the example (part 2) of the object file. The object file 122 includes function information on the function func1 in addition to the object information on the sub1.c at the normal time. The function information on the function func1 includes the task range information, the function cost information, and the function call information described below.

The task range information includes information (no) indicating that there is no task range. The function cost information includes function cost information C(func1, n) regarding the function func1. The function call information includes information indicating that there is no function call ("no function call").

The object file 123 includes function information on the function func2 in addition to the object information on the sub2.c at the normal time. The function information on the function func2 includes the task range information, the function cost information, and the function call information described below.

The task range information includes information (no) indicating that there is no task range. The function cost information includes function cost information C(func2, n) regarding the function func2. The function call information includes information that "func3 is called one time at the func2". This information indicates that the function func2 calls function func3 one time.

The object file 124 includes function information on the function func3 in addition to the object information on the sub3.c at the normal time. The function information on the function func3 includes the task range information, the function cost information, and the function call information described below.

The task range information includes information ("no") indicating that there is no task range. The function cost information includes function cost information C(func3, n) regarding the function func3. The function call information includes information indicating that there is no function call ("no function call").

Figure 16:
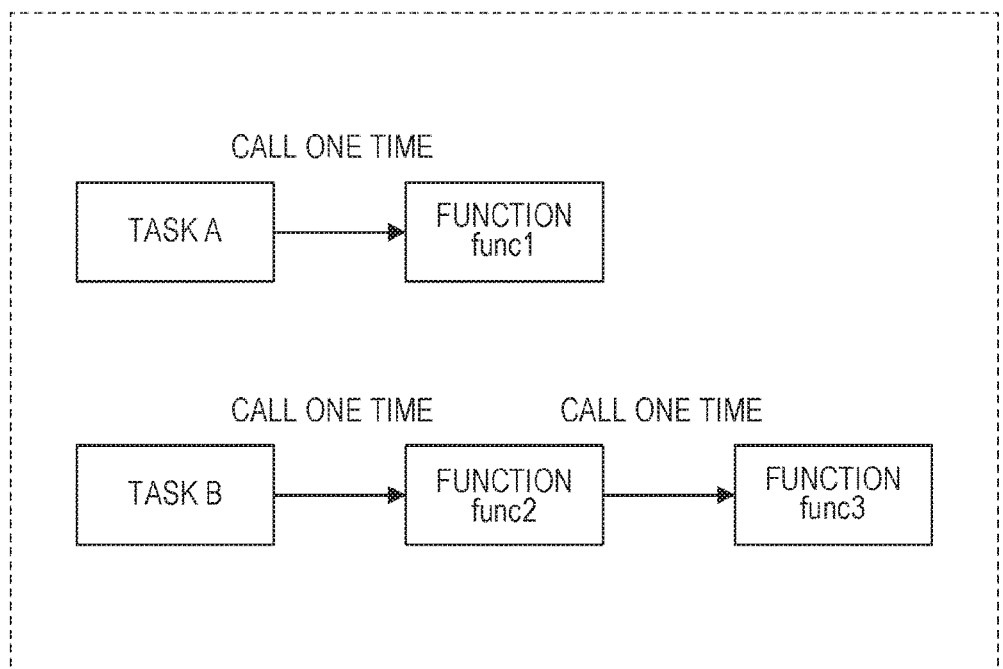
FIG. 16 is a diagram illustrating an example of a call relationship between the task and the function.

FIG. 16 is a diagram illustrating an example of call relationship between the task and the function. The function call analysis unit 153 grasps the call relationship between the task and the function based on the function call information added to the object files 121, 122, 123, and 124. For example, the function call analysis unit 153 grasps that the function func1 is called one time from the task A based on the function call information included in the object file 121. From the function call information on the function func1 included in the object file 122, the function call analysis unit 153 grasps that there is no other function calls from the function func1.

Furthermore, the function call analysis unit 153 grasps that the function func2 is called one time from the task B based on the function call information included in the object file 121. The function call analysis unit 153 grasps that the function func3 is called one time from the function func2 based on the function call information included in the object file 123. The function call analysis unit 153 grasps that there is no other function calls from the function func3 based on the function call information included in the object file 124.

FIG. 17 is a diagram illustrating an example of a task cost table. A task cost table 132 is created by the task cost analysis unit 154 and stored in the object file storage unit 120. The task cost table 132 is a table for managing the entire cost (including the parameter indicating the number of threads) calculated for each task. The task cost table 132 includes fields of a task and a cost.

The task name is registered in the field of task. The entire cost AIIC(t, n) of the task is registered in the field of cost. For example, in the task cost table 132, information indicating that the task is "task A" and the cost is "(2100/n)+2" is registered. This information indicates that the entire cost of the task A is expressed as (2100/n)+2 with the number of threads n as the parameter. In FIG. 17, the parameters indicating the number of threads are used in a distinguished manner as n and m for each task.

Here, as described above, the entire cost AIIC(task A, n) of the task A is expressed as C(task A, n)+Σ{AIIC(func1, n)×(the number of function func1 calls from the task A)}=C(task A, n)+AIIC(func1, n)×1.

C(task A, n) equals 2. In addition, AIIC(func1, n) is expressed as AIIC(func1, n)=C(func1, n)=2100/n. Accordingly, AIIC(task A, n) equals (2100/n)+2.

In the task cost table 132, information indicating that (10000/m)+10 is registered as the entire cost AIIC(task B, m) of the task B. AIIC(task B, m) is the result of calculation of C(task B, m)+C(func2, m)×1+C(func3, m).

The number of threads determination unit 155 determines the number of threads assigned to the tasks A and B when executing the tasks A and B in parallel, based on the costs of the tasks A and B registered in the task cost table 132.

FIG. 18 is a diagram illustrating an example of determining the number of threads. It is assumed that the number of usable cores is eight. The number of threads determination unit 155 obtains the AIIC(task A, 1)=2102 and AIIC(task B, 1)=10010 with the initial values n=1 and m=1. The number of threads assigned to the task having a large cost is increased by one, and then, the AIIC(task A, n) and AIIC(task B, m) are calculated again. This calculation is repeated until the n+m becomes eight, and acquires a set of (n, m)=(2, 6) as a final set of (n, m). In this case, the number of threads determination unit 155 determines the number of threads assigned to the task A as two. In addition, the number of threads determination unit 155 determines the number of threads assigned to the task B as six.

FIGS. 19A and 19B are diagrams illustrating examples of setting the number of threads. FIG. 19A illustrates an example of the object file 121 before setting the number of threads. FIG. 19B illustrates an example of the object file 121 after setting the number of threads. The number of threads change unit 156 sets in the object file 121 the number of threads of each task obtained by the number of threads determination unit 155.

For example, in the instruction sequence in the object file 121, a label ".global task 001" that indicates the task A and a label ".global task 002" that indicates the task B are included. The number of threads change unit 156 may acquire the label name of the label from the task range information on the object file 121. The number of threads change unit 156 rewrites the instruction immediately after each label such that the number of threads determined by the number of threads determination unit 155 is substituted in the register that determines the number of threads for starting the task.

For example, the number of threads change unit 156 substitutes a value of a first argument immediately after the label for a value of a second argument, and grasps in advance that the value of the second argument represents the number of threads. First, the number of threads change unit 156 searches for the label from the object, and changes the first argument (written as % register1) of the instruction (mov instruction in the second line) immediately after the ".global task 001" to two in order to change the number of threads. In addition, the number of threads change unit 156 changes the first argument (written as "% register1") of the instruction (mov instruction in 7th line) immediately after the ".global task 002" to six. In this case, by setting the immediate value of the first argument, it denotes that the immediate value is substituted.

Next, processing procedures by the information processing apparatus 100 described above are exemplified.

Figure 20:
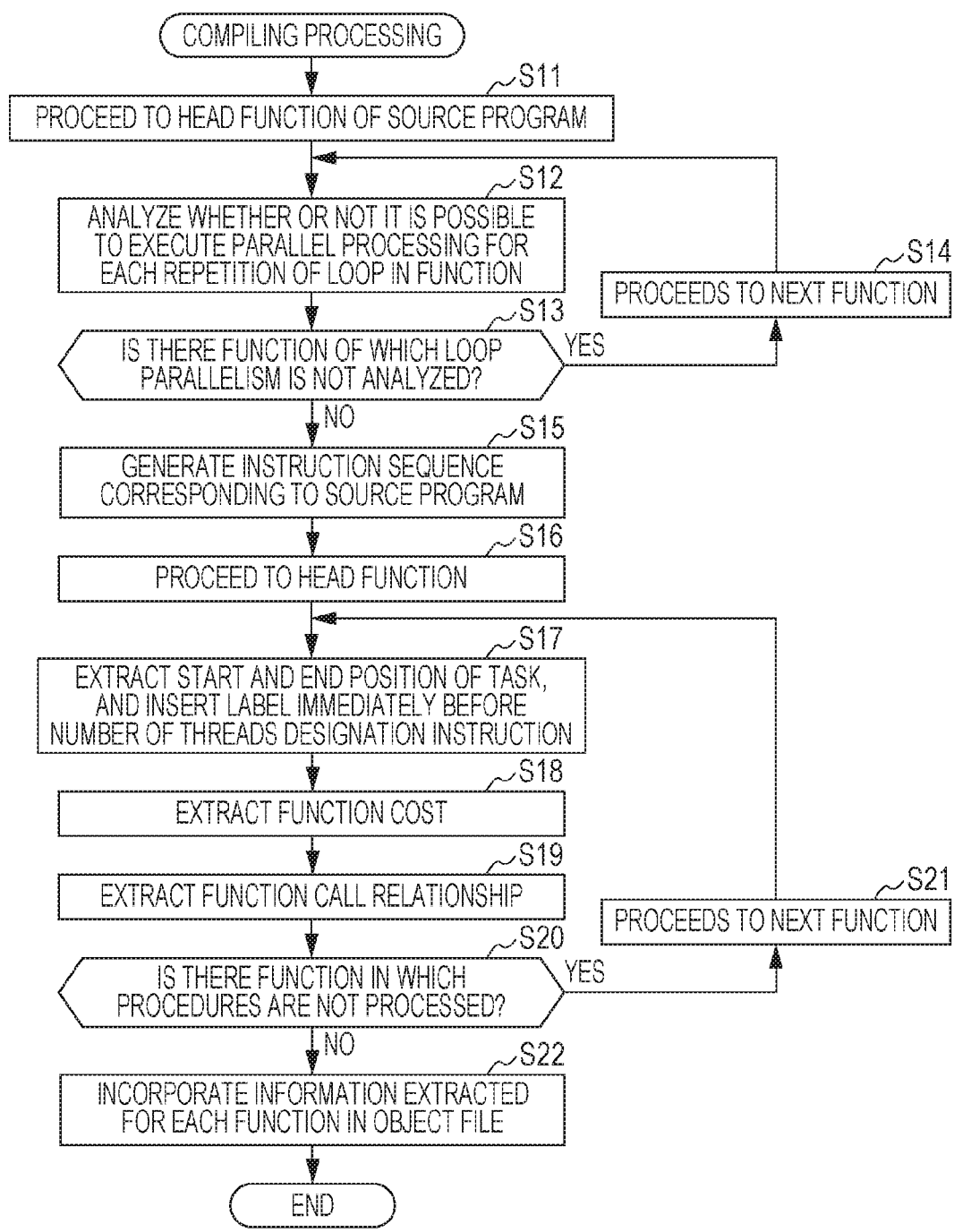
FIG. 20 is a flowchart illustrating an example of a compiling processing.

FIG. 20 is a flowchart illustrating an example of compiling processing. Hereinafter, the processing illustrated in FIG. 20 is described along with step numbers. The procedures described below are executed for each compiling of one source file.

(S11) The loop parallelism analysis unit 141 proceeds to the head function of the source program included in the source file. Specifically, the loop parallelism analysis unit 141 specifies the function written at the head by analyzing the syntax of the source program.

(S12) The loop parallelism analysis unit 141 analyzes the syntax of the source program and analyzes whether or not it is possible to execute the parallel processing for each repetition of the loop in the focused function. For example, in a case where each processing repeatedly executed as the loop may be independently executed (for example, in cases of being not affected by the result of previous processing, not affecting the result of next processing, or the like), the loop may be executed in parallel. The loop parallelism analysis unit 141 stores the information indicating whether or not the loop may be executed in parallel in the RAM 103. In a case where the loop is not included in the function, the process may skip STEP S12 and may proceeds to STEP S13.

(S13) The loop parallelism analysis unit 141 determines whether or not there is a function in which the loop parallelism is not analyzed. In a case where there is a function of which the loop parallelism is not analyzed, the process proceeds to STEP S14. In a case where there is no function of which the loop parallelism is not analyzed, the process proceeds to STEP S15.

(S14) The loop parallelism analysis unit 141 proceeds to the next function to be the analysis target (the focused function is the next function). Then, the process proceeds to STEP S12.

(S15) The compiler 140 generates an instruction sequence corresponding to the source program.

(S16) The task range extraction unit 142 proceeds to the head function to be processed. Specifically, the task range extraction unit 142 focuses on the instruction sequence corresponding to the head function in the source program and executes the next procedure.

(S17) The task range extraction unit 142 extracts the start and end position of the task in the focused instruction sequence and inserts the label immediately before the number of threads designation instruction. For example, in a case compiling the source file 111, the task range extraction unit 142 inserts the ".global task 001" into the instruction sequence for the object file 121 as the label of the task A. The task range extraction unit 142 inserts the ".global task 002" into the instruction sequence for the object file 121 as the label of the task B. In some cases, the task range extraction unit 142 does not extract the task range. In such a case, the insertion of the label is not performed, either. The task range extraction unit 142 stores in the RAM 103 the label name of the label inserted as the task range information. In a case where there is no inserted label, the effect indicating that there is no label name becomes the task range information.

(S18) The function cost analysis unit 143 extracts the cost C(t, n) that does not include the call destination function cost with regard to the task and the function based on the number of cycles table 125, and generates the function cost information for each task and the function. The function cost analysis unit 143 stores the generated function cost information in the RAM 103.

(S19) The function call extraction unit 144 extracts the function call relationship based on the source program and generates the function call information for each task and the function. In a case where there is no function call, the effect indicating that there is no function call is generated as the function call information. The function call extraction unit 144 stores the generated function call information in the RAM 103.

(S20) The task range extraction unit 142 determines whether or not there is a function in which the procedures STEP S17 to STEP S19 are not processed in the source program. In a case where there is a function in which the procedures are not processed, the process proceeds to STEP S21. In a case where there is no function in which the procedures are not processed, the process proceeds to STEP S22.

(S21) The task range extraction unit 142 proceeds to the next function to be processed (the next function becomes the focused function). Then, the process proceeds to STEP S17.

(S22) The function information addition unit 145 reads the task range information, the function cost information, and the function call information respectively generated in STEPs S17, S18, and S19 from the RAM 103 and incorporates the information in the object file when generating the object file.

In this way, the compiler 140 adds the task range information, the function cost information, and the function call information to the generated object file. When compiling a plurality of source file, the compiler 140 repeatedly executes the series of procedures STEPs S11 to S22 for each source file. The linker 150 executes the link processing based on the above described object file generated by the compiler 140.

Figure 21:
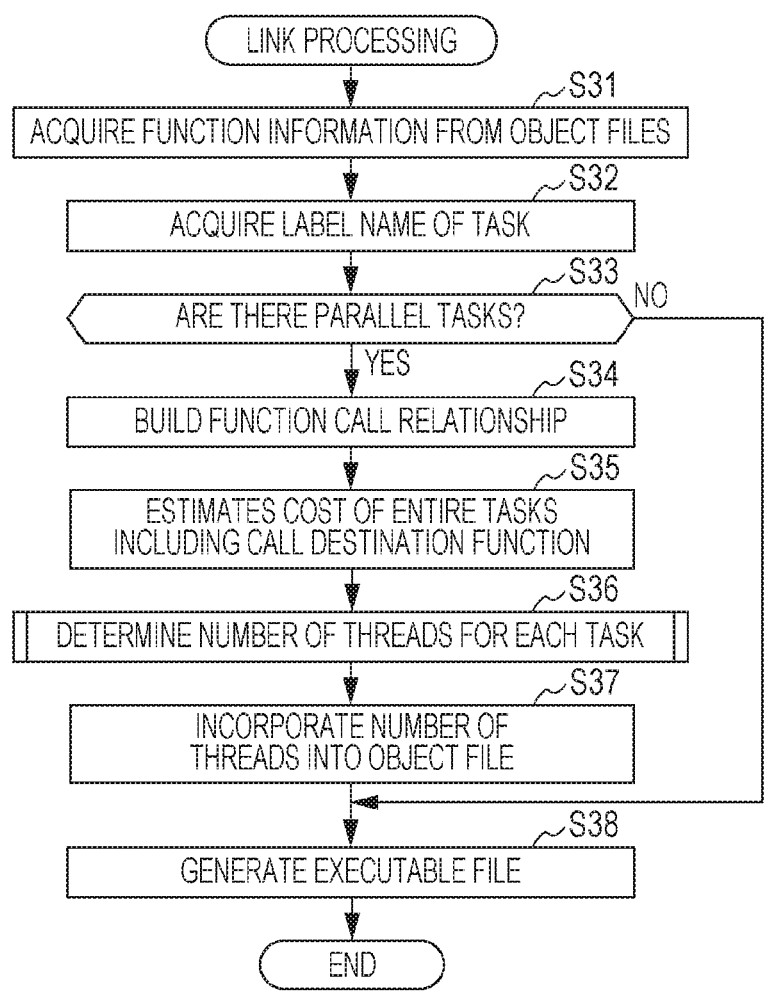
FIG. 21 is a flowchart illustrating an example of link processing.

FIG. 21 is a flowchart illustrating an example the link processing. Hereinafter, the processes illustrated in FIG. 21 are described along with the step numbers.

(S31) The function information acquisition unit 151 acquires the function information incorporated at the time of compiling from entire of the object files (for example, the object files 121, 122, 123, and 124) to be linked. The function information includes the task range information, the function cost information, and the function call information.

(S32) The task range analysis unit 152 acquires the label name of the task from the task range information from the task range information acquired in STEP S31 (in a case where the label name is acquired, a plurality of label names corresponding to a plurality of tasks executable in parallel may be acquired). In a case where the parallel tasks do not exist in each object file, the task range analysis unit 152 does not acquire the label name.

(S33) The task range analysis unit 152 determines whether or not there are parallel tasks. In a case where there are parallel tasks, the process proceeds to STEP S34. In a case where there is no parallel task, the process proceeds to STEP S38. For example, in a case where the label name is acquired in STEP S32, there are the parallel tasks. On the other hand, in a case where the label name may not be acquired in STEP S32, there is no parallel task.

(S34) The function call analysis unit 153 builds the function call relationship based on the function call information acquired in STEP S31. Specifically, as illustrated in FIG. 16, the function call analysis unit 153 builds the call relationship of the function call from a certain task and the call relationship of the function call from another function.

(S35) The task cost analysis unit 154 estimates the cost of the entire tasks including the call destination function (the cost including the parameter indicating the number of threads) based on the function call relationship built in STEP S34. For example the task cost analysis unit 154 estimates the AIIC(task A, n) for the task A. In addition, the task cost analysis unit 154 estimates the AIIC(task B, m) for the task B. A specific calculation method is, for example, illustrated in FIG. 17. For example, the task cost analysis unit 154 registers the results of estimations in the task cost table 132.

(S36) The number of threads determination unit 155 determines the number of threads for each task (details are described below).

(S37) The number of threads change unit 156 incorporates the number of threads for each task determined in STEP S36 into the object file. The method of incorporating the number of threads into the object file is, for example, illustrated in FIGS. 19A and 19B. In a case of the processing with respect to the object files 121, 122, 123, and 124, the number of threads change unit 156 incorporates the number of threads into the object file 121 among those object files.

(S38) The linker 150 generates the executable file 131 using the object files 121, 122, 123, and 124, and stores the executable file 131 in the executable file storage unit 130. Here, in a case of executing STEP S37, the number of threads for each task is incorporated in the object file 121, and the result of changing the number of threads is reflected in the executable file 131.

Figure 22:
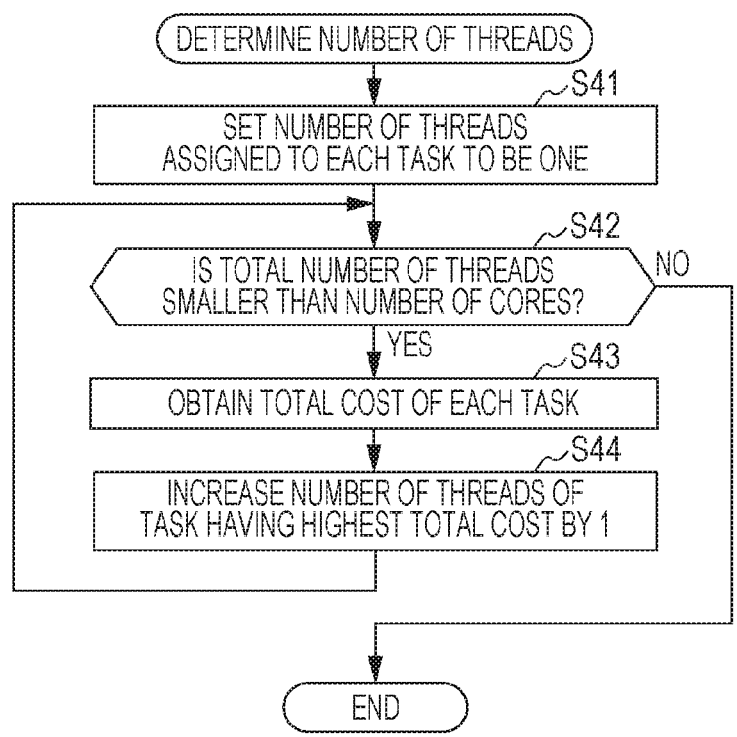
FIG. 22 is a flowchart illustrating an example of number of threads determination processing.

FIG. 22 is a flowchart illustrating an example of the number of threads determination processing. Hereinafter, procedures in FIG. 22 are described along with the step numbers. The procedures hereafter correspond to STEP S36 in FIG. 21.

(S41) The number of threads determination unit 155 sets the number of threads assigned to each task to be one.

(S42) The number of threads determination unit 155 determines whether or not the sum of the number of threads (total number of threads) assigned to each task is smaller than the usable cores (the total number of threads<the number of cores). In a case where the total number of threads is smaller than the number of cores, the process proceeds to STEP S43. In a case where the total number of threads is smaller than the number of cores, the number of threads currently assigned to each task is fixed to be the number of threads assigned to each task, and then, the process ends.

(S43) The number of threads determination unit 155 obtains the total cost of each task using the number of threads currently assigned to each task. For example, in a case of obtaining the total cost of the task A, the number of threads determination unit 155 substitutes the current number of threads for n, and then, obtains the value of AIIC(task A, n). In addition, in a case of obtaining the total cost of the task B, the number of threads determination unit 155 substitutes the current number of threads for m, and then, obtains the value of AIIC(task B, m).

(S44) The number of threads determination unit 155 increases the number of threads of the task having the highest total cost by 1. Then, the process proceeds to STEP S42.

As described above, the number of threads determination unit 155 determines the number of threads assigned to each task. In this way, it is possible to reduce the time difference in the ending time of tasks executed in parallel.

FIG. 23 is a diagram illustrating another example of a source program. In the second embodiment, a case where the number of parallel tasks is two is exemplified. However, the number of parallel tasks may be equal to or more than three. For example, in FIG. 23, a case is illustrated, where three parallel tasks (illustrated as "<task 1>", "<task 2>", and "<task 3>" in FIG. 23) in which the assigned numbers of threads are respectively designated as 6, 4, and 2.

Figure 24:
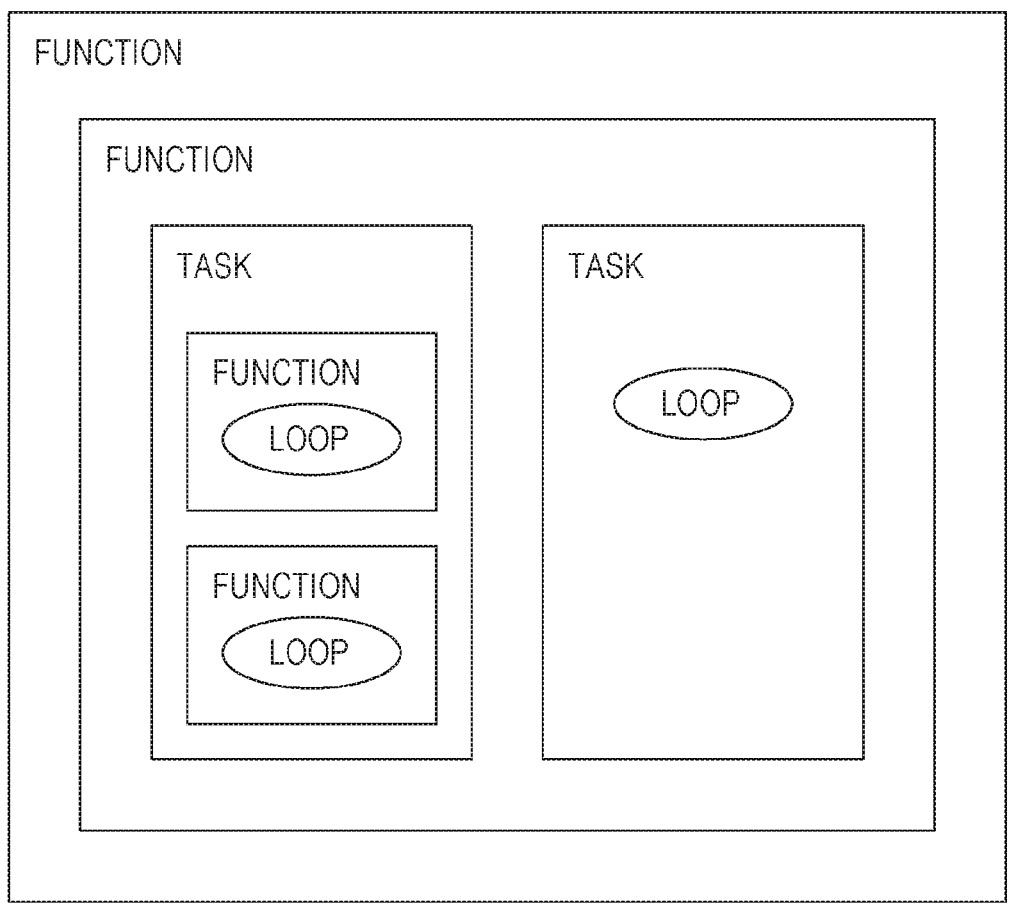
FIG. 24 is a diagram illustrating an example of a nested class of the task and the function.

FIG. 24 is a diagram illustrating an example of a nested class of the task and the function. Furthermore, in the second embodiment, a case where each task includes the function call instruction. However, in some cases, some tasks do not include the function call instruction. For example, as illustrated in FIG. 24, among the two tasks that may be executed in parallel, one task includes the function call. Another task includes the writing of the loop processing, but does not include the function call. In this case, regarding the latter task (the task that does not include the function call), AIIC(t, n) equals C(t, n). As described above, even in the case where the task that includes the function call instruction and the task that does not include the function call instruction are mixed in the parallel tasks, it is possible to determine the number of threads of each task by applying the method in the second embodiment.

As described above, for each source file, the compiler 140 individually obtains the number of cycles of each task and each function defined in the corresponding source file as the cost of the task and the function. In addition, the compiler 140 obtains the call relationship between the task and the function. Then, the compiler 140 incorporates the cost and the call relationship into the object file as an output. The linker 150 receives the cost and the call relationship incorporated in each object file as an input. Then, the linker 150 builds the function call relationships of the task, and then, obtains the entire costs including the cost of the function called from the task.

In this way, even in a case of the task across a plurality of source files, the cost of the entire tasks may be obtained. Thus, it is possible to adjust the number of threads of each task according to the obtained costs of the entire tasks such that the ending time of the processing of each task that are executed in parallel may be the same as much as possible. Therefore, each task may be executed with the appropriate number of threads compared to the case where the number of threads is assigned to the task without considering the cost, and thus, it is possible to shorten the overall execution time.

The compiler 140 incorporates the function cost information or the function call relationships into each object file, but may not manage the function cost information or the function call relationships in the separate files. The linker 150 may acquire the information on the function cost information and the function call relationships by referring to each object file to be linked.

In addition, the cost of each task may not be measured by executing the executable file in order to grasp the cost of each task. Furthermore, the amount of memory desired for analyzing all the tasks is smaller than that of the entire source program. Therefore, the amount of memory usage becomes smaller than that in a case of analyzing the tasks by summarizing in one (for example, summarizing in one source file).

The information processing in the first embodiment may be realized by causing the computer 1 to execute the program. In addition, the information processing in the second embodiment may be realized by causing the information processing apparatus 100 to execute the program.

The program may be recorded in the computer-readable recording medium 13. For example, by distributing the recording medium 13 in which the program is recorded, it is possible to distribute the program. In addition, the program may be stored in another computer and may be distributed via the network. The computer, for example, may store (install) the program recorded in the recording medium 13 or the program received from another computer in the storage device such as the RAM 103 or the HDD 104, and may execute the program by reading the program from the storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer configured to perform compiling, the computer comprising:
    a memory configured to store two or more source programs and
    a processor coupled to the memory and configured to execute a method comprising;
        compiling each of the source programs, wherein a number of cycles desired for executing each task defined in a source program of the source programs, a number of cycles desired for executing each function defined in the source program and called from a task in another source program of the source programs, and information indicating a call relationship between a task and a function called by the task are generated, and
        performing link processing, wherein the number of cycles desired for executing each task is calculated based on the number of cycles desired for executing the task and the number of cycles desired for executing the function called by the task by referring to the call relationship, wherein the source program the task is defined in is different from the another source program the function called from the task is defined in.

2. The computer configured to perform compiling according to claim 1,
    in the compiling, the generated number of cycles and the generated information indicating the call relationship are added to an object file generated in the compiling.

3. The computer configured to perform compiling according to claim 1,
    in the performing link processing, the number of cycles generated at the compiling and the call relationship generated at the compiling are acquired from a plurality of object files to be linked.

4. The computer configured to perform compiling according to claim 1,
    wherein information on the number of cycles generated in the compiling includes a number of cycles desired for executing instructions included in a definition of the task.

5. The computer configured to perform compiling according to claim 4,
    wherein the memory stores information on a correspondence relationship between each of the instructions and the number of cycles and
    in the compiling, information on the number of cycles is generated based on an instruction sequence generated from the source program and the correspondence relationship.

6. The computer configured to perform compiling according to claim 1,
    in the performing link processing, a first function called from the task and a second function called from the first function are specified based on the call relationship and the number of cycles desired for executing the task is calculated based on a sum of the number of cycles regarding each of the first function and the second function.

7. The computer configured to perform compiling according to claim 1,
    in the performing link processing, a number of threads assigned to each of a plurality of tasks is determined based on the number of cycles of each of the plurality of tasks that may be executed in parallel.

8. The computer configured to perform compiling according to claim 7,
    in the performing the link processing, the number of cycles of each of the plurality of tasks for each candidate of a combination of the number of threads assigned to each of the plurality of tasks is calculated.

9. The computer configured to perform compiling according to claim 7,
    in performing link processing, information on the determined number of threads is added to an object file generated by the compiling and an executable file using the object file is generated.

10. A non-transitory and computer-readable medium storing a compiler program that causes a computer to execute
    processing that outputs a number of cycles desired for executing each task defined in a source program, a number of cycles desired for executing each function defined in the source program and called by a task in another source program, and information indicating a call relationship between a task and a function called by the task when compiling the source program, wherein the source program the task is defined in is different from the another source program the function called from the task is defined in.

11. A non-transitory and computer-readable medium storing a link program that causes a computer to execute
    processing that calculates a number of cycles desired for executing each task based on a number of cycles desired for executing each task defined in a source program, a number of cycles desired for executing each function called by the task defined in another source program, and information indicating a call relationship between a task and a function called by the task generated at compiling the source program, wherein the source program the task is defined in is different from the another source program the function called from the task is defined in.

* * * * *